United States Patent
Hsin

(10) Patent No.: US 10,146,433 B2
(45) Date of Patent: Dec. 4, 2018

(54) METHOD FOR INITIALIZING NAND FLASH SERVING AS A BOOTING DEVICE

(71) Applicant: NOVATEK MICROELECTRONICS CORP., HsinChu (TW)

(72) Inventor: Chia-Hung Hsin, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 14/812,597

(22) Filed: Jul. 29, 2015

(65) Prior Publication Data

US 2015/0378609 A1 Dec. 31, 2015

Related U.S. Application Data

(62) Division of application No. 13/311,539, filed on Dec. 5, 2011.

(51) Int. Cl.
- *G06F 15/177* (2006.01)
- *G06F 3/06* (2006.01)
- *G06F 9/4401* (2018.01)

(52) U.S. Cl.
CPC .......... *G06F 3/0604* (2013.01); *G06F 3/0632* (2013.01); *G06F 3/0679* (2013.01); *G06F 9/4401* (2013.01)

(58) Field of Classification Search
CPC .................................................... G06F 9/4401
USPC .............................................................. 713/2
See application file for complete search history.

(56) References Cited

U.S. PATENT DOCUMENTS

| | | | | |
|---|---|---|---|---|
| 7,287,154 B1 * | 10/2007 | Puckette | .............. | G06F 9/4401 713/1 |
| 7,765,393 B1 | 7/2010 | Lee et al. | | |
| 7,873,822 B2 * | 1/2011 | Kim | ...................... | G06F 9/4401 710/10 |
| 7,979,667 B2 * | 7/2011 | Allen | .................. | G06F 12/0246 711/154 |
| 8,041,880 B2 * | 10/2011 | Terauchi | ............. | G06F 12/0246 711/103 |
| 8,051,204 B2 * | 11/2011 | Kai | ........................ | G06Q 10/06 709/242 |
| 8,051,329 B1 | 11/2011 | Mai | | |
| 8,171,277 B2 * | 5/2012 | Smith | ................. | G06F 11/1068 455/556.1 |
| 8,171,281 B2 * | 5/2012 | Sukegawa | ............. | G06F 9/4401 713/2 |
| 8,291,210 B2 * | 10/2012 | Kim | ...................... | G06F 9/4401 710/316 |

(Continued)

FOREIGN PATENT DOCUMENTS

| | | |
|---|---|---|
| CN | 1933027 A | 3/2007 |
| CN | 102043651 A | 5/2011 |
| TW | I322943 B | 4/2010 |

OTHER PUBLICATIONS

Jedrak, Michael. "NAND Flash memory in embedded systems", retreived Oct. 1, 2010. D&R Industry Articles.

*Primary Examiner* — Suresh Suryawanshi
(74) *Attorney, Agent, or Firm* — Rabin & Berdo, P.C.

(57) ABSTRACT

A method for initializing a NAND flash serving as a booting device includes the following steps. A NAND flash storing a boot table being identified by an identification (ID) of the NAND flash is provided. A current block of the NAND flash is searched to read the boot table. Configuration information of the boot table is read to initialize the NAND flash.

6 Claims, 1 Drawing Sheet

(56) References Cited

U.S. PATENT DOCUMENTS

| | | | | |
|---|---|---|---|---|
| 8,370,565 B2* | 2/2013 | Hung | ................... | G06F 1/24 |
| | | | | 711/103 |
| 8,417,880 B2* | 4/2013 | Lam | ................... | G11C 16/20 |
| | | | | 711/103 |
| 8,443,135 B2* | 5/2013 | Agarwal | ............... | G11C 16/20 |
| | | | | 711/103 |
| 8,621,194 B2* | 12/2013 | Duda | ................... | G06F 9/4406 |
| | | | | 711/103 |
| 2006/0245274 A1* | 11/2006 | Choi | ................... | G06F 13/28 |
| | | | | 365/189.12 |
| 2008/0200206 A1 | 8/2008 | Mansson et al. | | |
| 2012/0284497 A1* | 11/2012 | Hsin | ................... | G06F 9/4401 |
| | | | | 713/2 |
| 2015/0347294 A1* | 12/2015 | Ruan | ................... | G06F 13/102 |
| | | | | 711/103 |

\* cited by examiner

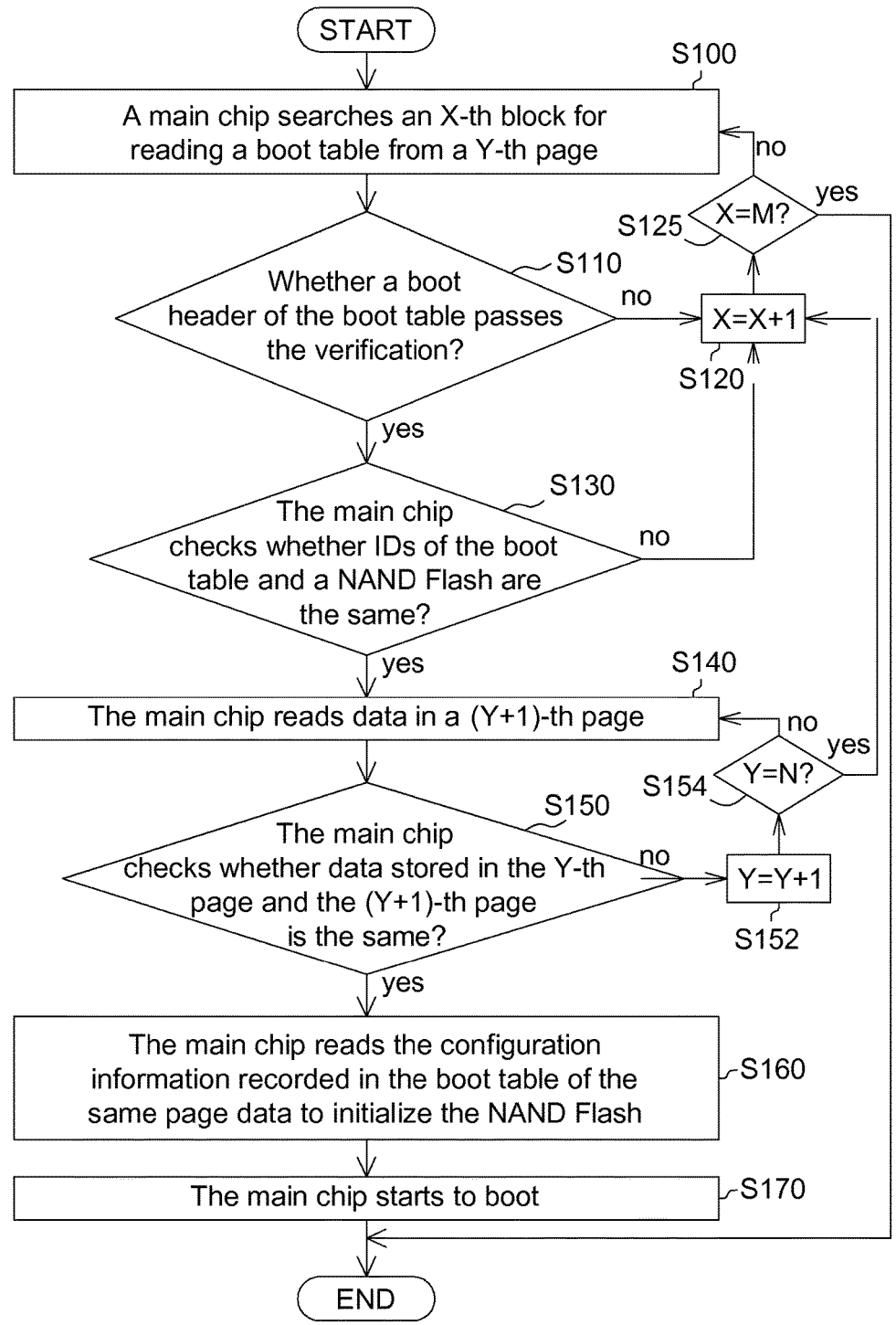

METHOD FOR INITIALIZING NAND FLASH SERVING AS A BOOTING DEVICE

The application is a divisional application of U.S. patent application Ser. No. 13/311,539 filed on Dec. 5, 2011, which claims the benefit of Taiwan application Serial No. 100115845, filed May 5, 2011; the subject matter of this application is incorporated herein by reference.

BACKGROUND

Technical Field

The invention relates in general to a booting method of a main chip.

Background

In a general booting process utilizing a NAND Flash, configuration of the NAND Flash, including page size, block size and a error correction code (ECC) type, has to be shown to a main chip, so that the main chip can initialize the NAND Flash and then send instructions to read the NAND Flash.

Traditionally, the configuration information of the NAND Flash is obtained in two ways. In the first way, 5 general purpose I/O (GPIO) pins of the main chip are utilized to connect to the NAND Flash to obtain the configuration information. Two of the GPIO pins are utilized to obtain information of the page size, another two of the GPIO pins are utilized to obtain information of the block size, and the remain one of the GPIO pins is utilized to obtain information of the ECC type. Then, the main chip is able to initialize the NAND Flash according to the configuration information obtained by the GPIO pins. However, utilization of the GPIO pins makes the cost of package remain high.

In the second way, a boot table including identifications (IDs) of the current NAND Flashes and corresponding configuration information may be created, and then recorded in a read only memory (ROM). When the NAND Flash is utilized to boot, the main chip may read the ID form the NAND Flash and then look it up in the boot table in the ROM accordingly, so as to obtain the corresponding configuration information. Afterwards, the main chip can initialize the NAND Flash according to the configuration information obtained from the boot table. However, the boot table only records existing NAND Flashes, thus lack of expandability and unable to support the future new NAND Flashes.

SUMMARY

The disclosure is directed to a method for initializing a NAND flash serving as a booting device, capable of supporting all types of NAND Flash by placing a corresponding boot table in the NAND Flash and booting in software algorithm.

According to one aspect of the present disclosure, a method for initializing a NAND flash serving as a booting device is provided. The method includes the following steps. A NAND flash storing a boot table being identified by an identification (ID) of the NAND flash is provided. A current block of the NAND flash is searched to read the boot table. Configuration information of the boot table is read to initialize the NAND flash.

The invention will become apparent from the following detailed description of the preferred but non-limiting embodiments. The following description is made with reference to the accompanying drawings.

BRIEF DESCRIPTION OF THE DRAWINGS

FIG. 1 shows a flow chart showing a booting method of a main chip according to an embodiment.

DETAILED DESCRIPTION OF THE INVENTION

The disclosure proposes a booting method of a main chip, capable of supporting all types of NAND Flash by placing a corresponding boot table in the NAND Flash and booting in software algorithm.

Referring to FIG. 1, a flow chart showing a booting method of a main chip according to an embodiment is shown. The booting method of the main chip disclosed in FIG. 1 substantially utilizes a NAND Flash to boot. The NAND Flash includes M blocks, each including N pages, M and N being positive integers. Data recorded in each page in the single block of the NAND Flash is substantially the same.

In step S100, the main chip searches an X-th block of the NAND Flash for reading a boot table from a Y-th page, X and Y being non-negative integers respectively smaller than M and N. In the disclosure, the boot table includes a boot hear, an identification (ID), and configuration information of the NAND Flash corresponding to the ID, for example. The configuration information at least includes page size, block size or error correction code (ECC) type of the NAND Flash. In the disclosure, the boot table stores in the first 1024 bytes of at least two blocks of the NAND Flash, for example. Besides, traditional data loss problems easily caused by storing data in the NAND Flash are overcome by utilizing the ECC.

In step S110, the main chip verifies the boot header of the boot table. The verification is such as to determine whether the boot header includes a verification string "BootFromNAND". When the boot header fails the verification, representing that the current X-th block is not a boot block, it proceeds to step S120, and 1 is added to X. Then, in step S125, whether X is equal to M is determined. If not, it backs to step S100 to search a next block. When the boot header passes the verification, it represents that the X-th block is the boot block. If X is equal to M, it represents that all block are not the boot block, and it proceeds to an end.

Proceeding to step S130, the main chip reads ID of the NAND Flash from the NAND Flash, and checks whether the ID of the boot table and the ID of the NAND Flash are the same. When the ID of the boot table is different from the ID of the NAND Flash, it represents that data recorded in the boot table of the X—the block may be wrong. Thus it proceeds to step S120, and 1 is added to X and then it backs to step S100 to search the a next boot block to read a correct boot table.

When the ID of the boot table is the same as the ID of the NAND Flash, it proceeds to step S140, and the main chip reads data in a (Y+1)-th page. The Y-th page and the (Y+1)-th page in the same X-th block should store the same data on the basis of characteristics of the NAND Flash. Thus in step S150, the main chip checks whether data stored in the Y-th page and the (Y+1)-th page is the same. If not, it proceeds to step S152, and 1 is added to Y. Then it proceeds to step S152, whether Y is equal to N is determined. If Y is not equal to N, steps S140 and S150 are repeated until there are two pages storing the same data. On the basis of characteristics of the NAND Flash, the steps S140 and S150 further raise data accuracy of the NAND Flash in the disclosure. When Y is equal to N, it represents that there is still no the same data as the end page of the current block is searched. Thus, it backs to step S120 to search the next block.

When data stored in the different pages, the Y-th page and the (Y+1)-th page for example, is the same, the main chip reads the configuration information recorded in the boot table of the same page data to initialize the NAND Flash in step S160. Afterwards, in step S170, the main chip starts to boot. It is observed that, in the booting method of the main chip disclosed above, the boot table built in the NAND Flash only needs to record the ID and the configuration information of the NAND Flash itself. Compared with the traditional boot table built in the ROM recording the IDs and the configuration information of numerous existing different types of NAND Flashes, the disclosed booting method of the main chip saves huge memory space.

The a booting method of a main chip proposed in the disclosure places the corresponding boot table in the NAND Flash, thus huge memory space is saved and the lack of expandability is solved. Meanwhile, the ECC, such as every 512 bits data corresponding to 15 bits ECC, is utilized in the disclosure to raise the data accuracy, hence the traditional data loss problems easily caused by storing data in the NAND Flash are overcome. In addition, the booting method of the main chip in the disclosure substantially boots in software algorithm without using additional GPIO pins, thus the pins are saved and the packing cost is reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for initializing a NAND flash serving as a booting device, comprising:
    providing a NAND flash storing a boot table being identified by an identification (ID) of the NAND flash;
    searching a current block from a plurality of blocks of the NAND flash to read the boot table from a current page of a plurality of pages, wherein data recorded in each page in the plurality of blocks of the NAND flash is the same;
    reading the ID of the NAND flash;
    checking data correctness of the current block by comparing ID of the boot table and the ID of the NAND flash; and
    searching a next block to read the boot table from the next block when the ID of the boot table and the ID of the NAND flash are different;
    wherein when the ID of the boot table and the ID of the NAND flash are the same, reading the data in the current page and entering a process of checking whether the current page and a next page store the same data, and the process is repeated until the current page and the next page store the same data.

2. The method according to claim 1, further comprising:
    reading configuration information of the boot table to initialize the NAND flash;
    wherein the configuration information at least includes page size of the NAND flash, block size of the NAND flash and error correction code type of the NAND flash.

3. The method according to claim 1, further comprising:
    booting a device after the NAND flash is initialized.

4. The method according to claim 1, wherein if the current page and the next page store different data, the next page is assigned to be the current data.

5. The method according to claim 1, further comprising:
    reading configuration information recorded in the boot table of a same page data to initialize the NAND flash if the current page and the next page store the same data;
    wherein the same page data is comprised in both the current page and the next page.

6. The method according to claim 5, wherein when the current page and the next page store the same data, the same page data means the data stored in the current page or the next page.

* * * * *